(12) United States Patent
Wright et al.

(10) Patent No.: US 8,760,833 B2
(45) Date of Patent: Jun. 24, 2014

(54) APPARATUS AND METHODS FOR LIMITING SURGES IN LOAD CURRENT

(75) Inventors: Robert S Wright, Spring, TX (US); Nam Nguyen, Houston, TX (US); Richard W Clutter, Highlands, TX (US)

(73) Assignee: Hewlett Packard Development Company, L.P., Houston, TX (US)

( * ) Notice: Subject to any disclaimer, the term of this patent is extended or adjusted under 35 U.S.C. 154(b) by 351 days.

(21) Appl. No.: 13/396,258

(22) Filed: Feb. 14, 2012

(65) Prior Publication Data

US 2013/0208384 A1 Aug. 15, 2013

(51) Int. Cl.
*H02H 7/00* (2006.01)

(52) U.S. Cl.
USPC .................................................. 361/92

(58) Field of Classification Search
USPC .................................................. 361/92
See application file for complete search history.

(56) References Cited

U.S. PATENT DOCUMENTS

| | | | |
|---|---|---|---|
| 4,001,604 A * | 1/1977 | Parks et al. | 327/78 |
| 5,189,653 A * | 2/1993 | Yanagi | 369/44.32 |
| 6,347,029 B1 | 2/2002 | Ouyang et al. | |
| 7,548,044 B2 | 6/2009 | Itoh et al. | |
| 7,689,841 B2 | 3/2010 | Lee | |
| 7,782,022 B2 | 8/2010 | Xu et al. | |
| 8,035,939 B2 * | 10/2011 | Orr et al. | 361/91.1 |
| 8,669,750 B2 * | 3/2014 | Apriletti et al. | 323/282 |
| 2010/0157498 A1 | 6/2010 | Skov et al. | |
| 2010/0315750 A1 | 12/2010 | Maher et al. | |

* cited by examiner

*Primary Examiner* — Stephen W Jackson

(57) ABSTRACT

Apparatus and methods related to limiting surge current are provided. An under-voltage condition on a node is sensed and respective signals are provided in response. The under-voltage condition correlates to a surge in load current drawn from the node. A foldback signal is provided to a power controller to adjust the voltage on the node. The foldback signal is nullified when the surge current condition has been curtailed. Printers, computers and other apparatus can include surge current-limiting accordingly.

15 Claims, 6 Drawing Sheets

APPARATUS AND METHODS FOR LIMITING SURGES IN LOAD CURRENT

BACKGROUND

Printers, computers and other apparatus require electrical energy in order to perform their respective normal functions. Surges in electrical current consumption of such an apparatus can occur as a result of circuit faults, overloads, temperature-related variances, and other factors. Evolving rule and law in this area mandate systems and methods that respond quickly to curtail electrical surges in the interest of energy conservation, device protection and other considerations. The present teachings address the foregoing and related concerns.

BRIEF DESCRIPTION OF THE DRAWINGS

The present embodiments will now be described, by way of example, with reference to the accompanying drawings, in which.

DETAILED DESCRIPTION

Introduction

The Apparatus and methods related to limiting surge currents within printer, computers and other devices are provided. An under-voltage condition on a node is sensed, and respective signals are provided in response. The under-voltage condition correlates to a surge in load current drawn from that node. A foldback signal is generated and provided to a power controller so as to adjust the voltage on the node. The foldback signal is nullified when the surge current condition has been curtailed. Various apparatus can include surge current-limiting circuitry or methodology according to the present teachings.

In one example, an electronic circuit is configured to detect an under-voltage condition at a power output node, and to provide an undervolt signal in accordance with the detecting. The electronic circuit is also configured to provide a hold-track signal that is derived by way of the undervolt signal, and to provide a peak level signal by way of sampling a voltage correspondent to a load current. The electronic circuit is also configured to provide a foldback signal in accordance with a comparison of the hold track signal with the peak-level signal. The electronic circuit is configured to couple the foldback signal to a current sensing input of a power controller, so as to limit a surge in the load current.

In another example, a method includes generating an undervolt signal in response to sensing an under-voltage condition at an electrical node. The method also includes generating a hold-track signal by way of the undervolt signal. The method additionally includes generating a peak level signal by way of sampling a voltage correspondent to a load current. The method further generating a foldback signal in accordance with a comparison of the hold track signal with the peak-level signal. The foldback signal is characterized so as to cause a power controller to adjust a voltage at the electrical node.

First Illustrative Embodiment

Figure 1:
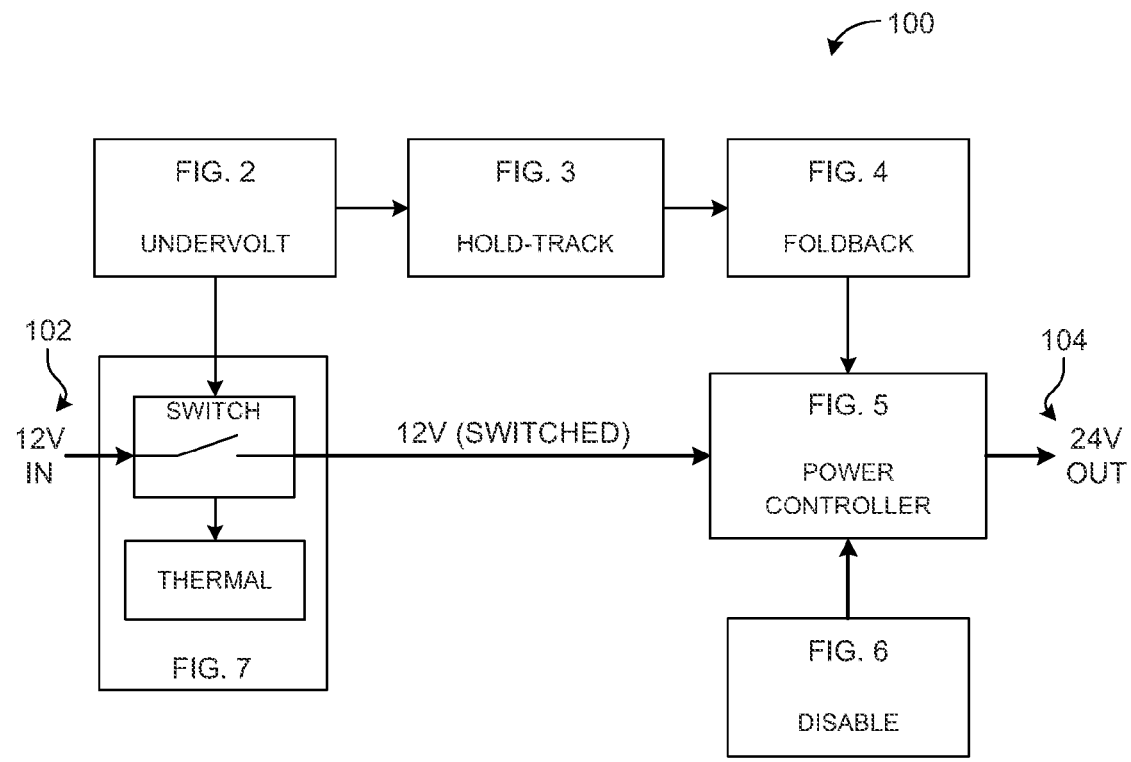
FIG. 1 is a block schematic diagram of a cooperative relationship of circuitry according to one example of the present teachings.

An embodiment of surge current-limiting circuitry (circuitry) according to the present teachings is now described. Such circuitry is shown by way of FIGS. 2-7, collectively. FIG. 1 is block schematic diagram 100 depicting the overall cooperative relationship of the circuitry depicted in FIGS. 2-7. Other embodiments of surge current-limiting circuitry can also be used in accordance with the present teachings.

With reference to FIG. 1, a source of twelve volt direct-current energy (source) 102 is provided and an output of twenty-four volt energy 104 is derived there from. The output 104 is also referred to as a power output node 104 for purposes herein. Such derivation (or generation) is performed by way of a switching-type voltage-boost power controller as depicted in FIG. 5. The other circuitry, as collectively represented by FIGS. 2-4 and 6-7, perform respective functions in accordance with the present teachings.

Figure 2:
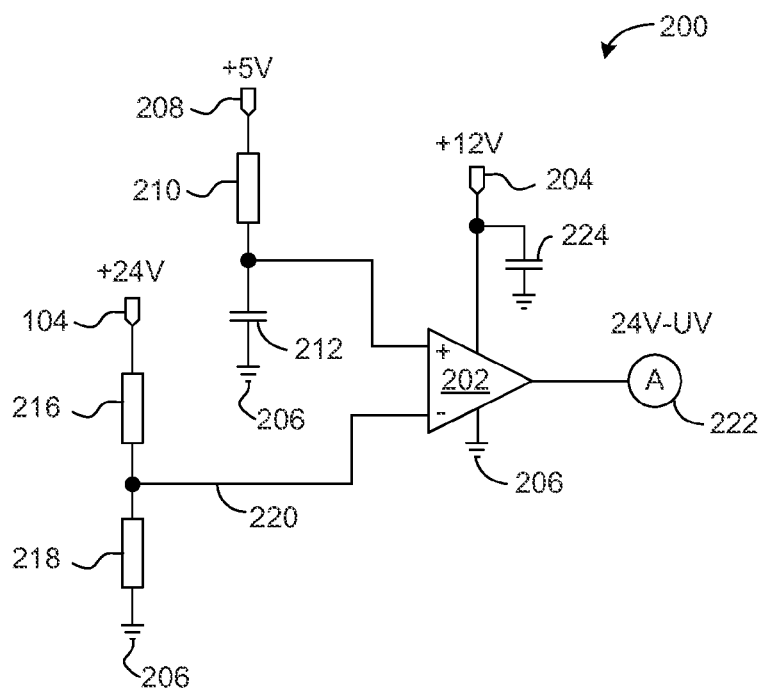
FIG. 2 depicts a schematic view of an under-voltage detection circuit according to another example.

With reference to FIG. 2, an under-voltage detection circuit (UV circuit) 200 according to the present teachings is depicted. The UV circuit 200 includes an operational amplifier (i.e., op-amp) configured to operate as a comparator 202. The comparator 202 is connected to twelve volt direct-current (DC) energy at a node 204 and to ground potential at a node 206. In one non-limiting example, the comparator 202 is defined by a model LM358 op-amp, as available from Texas Instruments Incorporated, Dallas, Tex., USA. Other suitable op-amps or comparators can also be used. A capacitor 224 filters the voltage at the node 204.

The comparator 202 is coupled to a reference of five volts potential at a node 208 by way of a resistor 210 and a filter capacitor 212. In one non-limiting example, the resistor 210 is 100 K-Ohms in value, and the capacitor 212 is 0.1 microfarads in value, respectively. Other respective values can also be used. The comparator 202 is also coupled to the node 104 by way of respective resistors 216 and 218. In one non-limiting example, the resistor 216 is 30 K-Ohms in value, and the resistor 218 is 11 K-Ohms in value, respectively. Other respective values can also be used. The resistors 216 and 218 are connected to define a voltage divider that derives a signal at a node 220 that is of lesser voltage than that at the power output node 104.

The node 104 provides twenty-four volts potential under normal operating conditions. The UV circuit 200 operates to detect an under-voltage condition on the node 104 by way of comparing the voltage at the node 208 with that at the node 220. An undervolt signal (24 V-UV) is provided (or asserted) at a node 222 ("A") in response to detecting such an under-voltage condition at the power output node 104.

Figure 3:
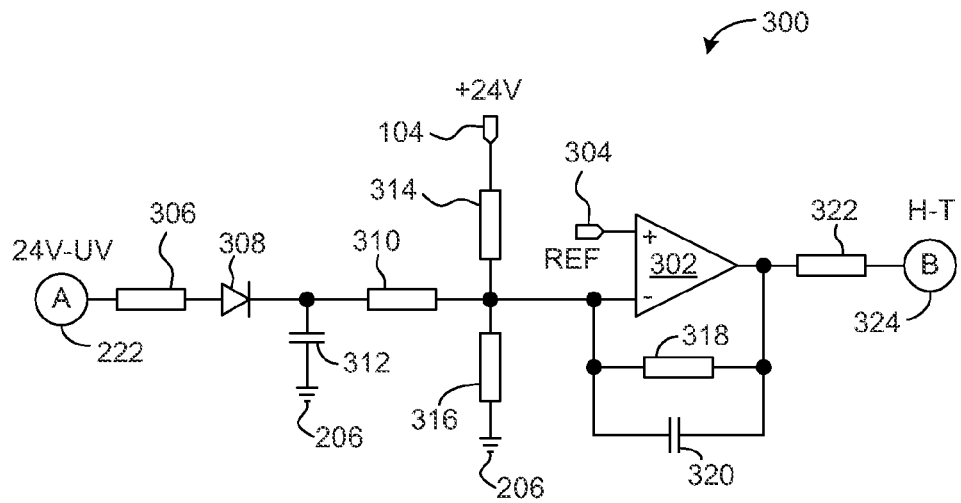
FIG. 3 depicts a schematic view of a hold-track circuit according to another example.

Referring now to FIG. 3, a hold-track circuit (HT circuit) 300 according to the present teachings is depicted, The HT circuit 300 includes an operational amplifier op-amp) configured to operate as an integrator 302. In one non-limiting example, the integrator 302 is defined by a model LM358 op-amp, as available from Texas Instruments. Other suitable op-amps can also be used. The integrator 302 is connected to reference signal (REF) at a node 304.

The integrator 302 is coupled to the undervolt signal at the node 222 by way of a resistor 306, a diode 308, a resistor 310 and a capacitor 312. In one non-limiting example, the resistor 306 is 1 K-Ohm in value, the diode 308 is a model 1N914 silicon small-signal diode, the resistor 310 is 100 K-Ohm in value and the capacitor 312 is 1.0 microfarad in value. Other suitable component values or definitions can also be used for elements 306-312, respectively.

The integrator 302 is also coupled to receive a bias voltage derived by a voltage divider defined by a resistor 314 and a resistor 316. In one non-limiting example, the resistor 314 is 330 K-Ohm in value and the resistor 316 is 22 K-Ohm in value. Other suitable resistors 314 or 316 can also be used. A parallel combination of a resistor 318 and capacitor 320 define a feedback circuit for the integrator 302.

During normal operation, the undervolt signal at node 222 is coupled to the capacitor 312 by way of the diode 308. The capacitor 312 stores a charge corresponding to a most recent peak value in the undervolt signal which, in the absence of new undervolt signal input at the node 222, decays over time toward the bias voltage value by way of resistors 310, 314 and 316. Thus, a time constant is defined for the HT circuit 300. In turn, a signal derived from the undervolt signal at node 222 is compared with the reference voltage at node 304 and a resulting signal is time-integrated to define an output from the integrator 302. The output is coupled to a node 324 by way of a resistor 322, defining a hold-track (H-T) signal. In one non-limiting example, the resistor 322 is 360 K-Ohm in value. Other resistors values can also be used.

Figure 4:
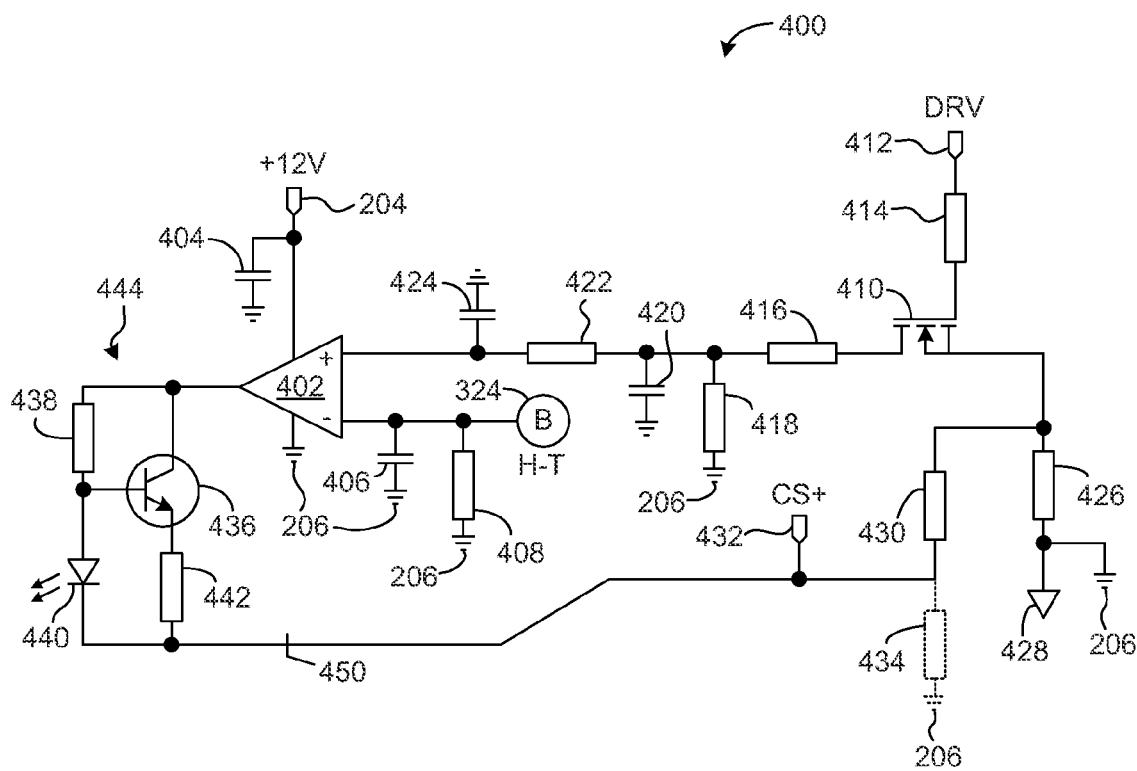
FIG. 4 depicts a schematic view of a foldback circuit according to another example.
Figure 5:
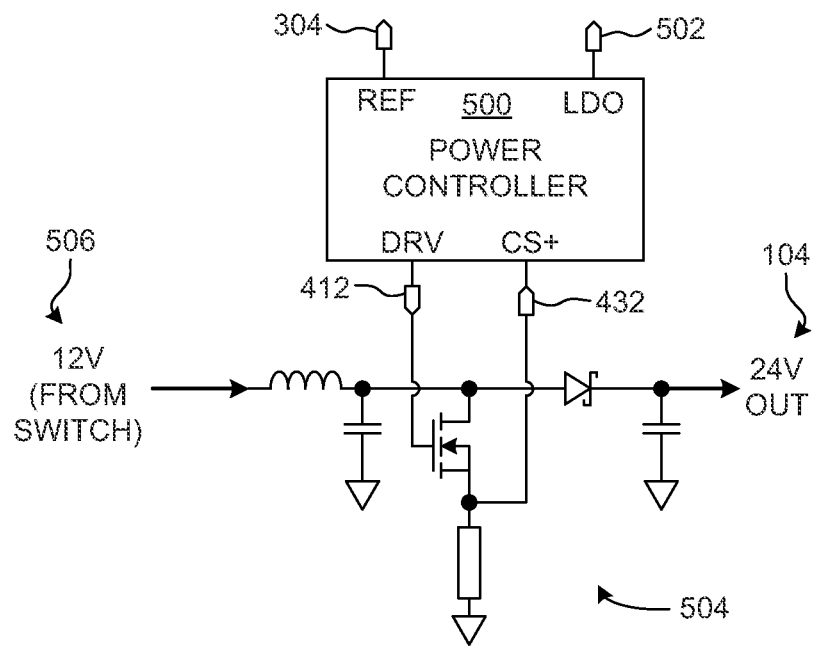
FIG. 5 depicts a schematic view of a power controller and illustrative boost circuitry.

Reference is now made to FIG. 4, which depicts a foldback circuit 400 according to the present teachings. The foldback circuit 400 includes an operational amplifier (i.e., op-amp) configured to operate as a comparator 402. The comparator 402 is connected to twelve volt direct-current (DC) energy at the node 204 and to ground potential at the node 206. A capacitor 404 functions to filter the voltage at the node 204. In one non-limiting example, the comparator 402 is defined by a model LM358 op-amp, as available from Texas Instruments. Other suitable op-amps or comparators can also be used.

The comparator 402 is coupled to receive the H-T signal at the node 324. A capacitor 406 and a resistor 408 couple the node 324 to ground potential at node 206. In one non-limiting example, the capacitor 406 is 0.01 microfarads in value and the resistor 408 is 7.5 K-Ohm in value. Other suitable values can also be used. The foldback circuit 400 also includes a transistor 410 configured to operate as a switch according to a driving signal (DRV) at a node 412, by way of a resistor 414. In one non-limiting example, the transistor 410 is a model 2N7002 N-channel enhancement mode MOSFET, as available from Fairchild Semiconductor, San Jose, Calif., USA, while the resistor 414 is 100.0-Ohm in value. Other suitable components or values can also be used.

The transistor 410 is coupled to the comparator 402 by way of a resistor 416 and a resistor 418 and a capacitor 420 and a resistor 422 and a capacitor 424. In one non-limiting example, the resistor 416 is 100.0-Ohm in value, the resistor 418 is 100 K-Ohm in value, the capacitor 420 is 0.1 microfarads in value, the resistor 422 is 1.0 M-Ohm in value and the capacitor 424 is 1.0 microfarads in value. Other suitable values can also be used. The capacitor 424 and the resistor 422 are configured to define a time constant for the foldback circuit 400.

The foldback circuit 400 also includes a resistor 426 electrically connected to both circuit ground potential at node 206, and power buss ground potential at a node 428. Another resistor 430 couples the resistor 426 to a current sensing (CS+) node 432. The power controller represented in FIG. 5 senses a voltage corresponding to load current by way of the CS+ node 432. In one non-limiting example, the resistor 426 is 0.01-Ohm in value and the resistor 430 is 30.0-Ohm in value. Other suitable values can also be used. In an optional example, a resistor 434 is also connected between the node 432 and ground potential at node 206.

The foldback circuit 400 further includes a transistor 436 and a resistor 438 and a light-emitting diode (LED) 440 and a resistor 442, collectively configured to define a constant-current circuit 444. In one non-limiting example, the transistor 436 is a model 2N3904 bipolar transistor, as available from Fairchild Semiconductor, while the resistor 438 is 100 K-Ohm in value, the LED 440 has a forward voltage of about 1.8 volts DC at 5.0 milli-amperes, and the resistor 442 is 270.0-Ohm in value. Other suitable components or values can also be used.

Typical normal operations of the foldback circuit 400 are as follows: load current (e.g., to a print engine, a computer circuit card, or other) is sensed as a voltage at the CS+ node 432. A pulse-width modulated (PWM) DRV signal at the node 412 is provided by the power controller of FIG. 5. The transistor 410 is triggered by the DRV signal to provide voltage pulses corresponding to peak-level load-current values to the comparator 402 by way of the elements 416-424, inclusive. Thus, the load current through resistor 426 is sampled at (about) peak-level instances and a corresponding voltage signal is present across the capacitor 424. Concurrently, the HT signal at node 324 is provided to the comparator 402 by way of the elements 406-408, inclusive.

The comparator 402 compares the HT signal and the peak-level signal and provides a resulting output to the constant-current circuit 444. The constant-current circuit 444 derives a foldback signal 450 that is coupled to the CS+ node 432. The general result is that the current sense signal at node 432 is biased toward a greater voltage value, in response to detecting a surge in load current by way of an under-voltage condition on the power output node 104.

The power controller (FIG. 5) responds to the increased voltage at the CS+ node 432 by causing a decrease in the voltage present at the power output node 104. Thus, a negative feedback control loop is defined, and surges in load current are limited or curtailed in accordance with the present teachings.

Attention is now directed to FIG. 5, which depicts a block diagram of a power controller 500. The power controller 500 is illustrative and non-limiting with respect to the present teachings. Other power controllers, related or peripheral circuitry, and so on can also be used.

In one non-limiting example, the power controller 500 includes or is defined by a model MAX668 step-up PWM boost controller, as available from Maxim Integrated Products, Sunnyvale, Calif., USA. Other suitable power controllers or integrated circuits can also be used.

The power controller 500 provides a reference voltage output at the REF node 304 introduced above. In one example, the voltage at the node 304 is about 1.250 volts DC. The power controller 500 senses load-current input at the CS+ node 432 introduced above. The power controller also provides a PWM transistor drive-signal at the DRV node 412 introduced above. The power controller 500 also provides a low-dropout regulation (LDO) signal at a node 502. In one example, the voltage at the LDO node 502 is about 5.0 volts DC.

During typical normal operation, the power controller 500 provides the PWM signal at the DRV node 412 to a transistor of a switching-type voltage-boost circuit 504. In turn, the power controller 500 senses load current at the node CS+ node 432 by way of a current sense resistor of the circuit 504.

Figure 6:
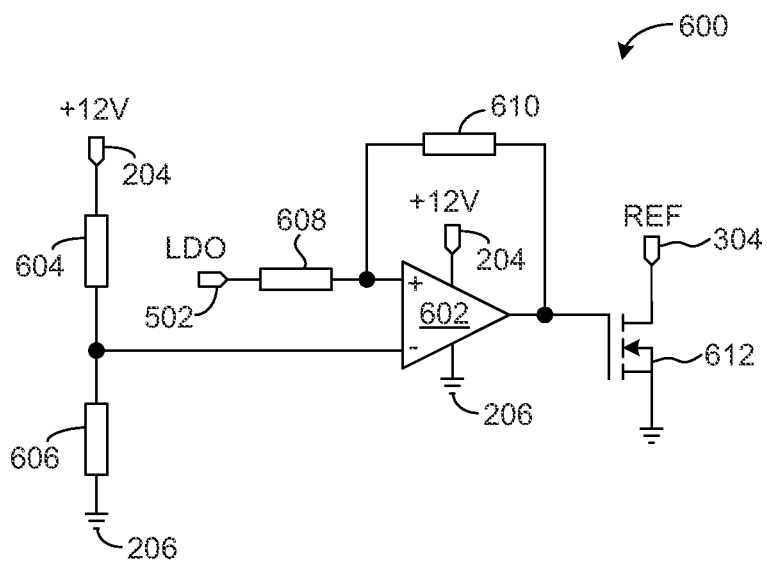
FIG. 6 depicts a schematic view of a disable circuit according to another example.
Figure 7:
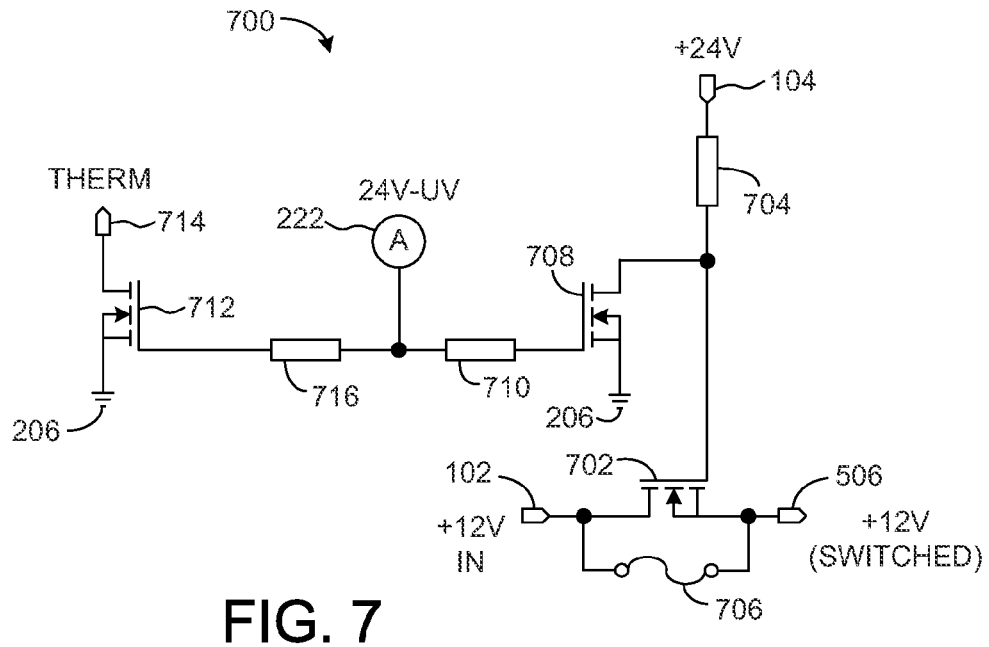
FIG. 7 depicts a schematic view of a switch circuit according to another example.

An inductor of the circuit 504 is coupled to twelve volts DC power at a node 506 as provided the switch circuit of FIG. 7. PWM control of the circuit 504 modulates current flow through the inductor, resulting in twenty-four volts DC potential at the power output node 104. The power controller 500 is also coupled to circuitry in accordance with the present teachings as depicted by FIGS. 2, 3, 4, 6 and 7, inclusive, and responds to the respective signals provided there from so as to limit surge current to a load.

Attention is now turned to FIG. 6, which depicts a disable circuit 600 according to the present teachings. The disable circuit 600 includes an operational amplifier (i.e., op-amp) configured to operate as a comparator 602. The comparator 602 is connected to twelve volts DC at the node 204 and to ground potential at the node 206. In one non-limiting example, the comparator 602 is defined by a model LM358 op-amp, as available from Texas Instruments. Other suitable op-amps or comparators can also be used.

The comparator 602 is coupled to sense the voltage at the node 204 by way of voltage divider defined by a resistor 604 and a resistor 606. In one non-limiting example, the resistor 604 is 12 K-Ohm in value and the resistor 606 is 11 K-Ohm in value. Other suitable values can also be used. The comparator 602 is also coupled to sense the voltage at the LDO node 502 by way of a resistor 608. In one example, the resistor 608 is 10 K-Ohm in value. Other resistive values can also be used.

The disable circuit 600 includes a resistor 610 coupled to define a positive-feedback pathway between an output and a non-inverting input of the comparator 602. Thus, the disable circuit 600 is characterized by hysteresis during normal operation. In one example, the resistor 610 is 330 K-Ohm in value. Other values can also be used. The disable circuit 600 further includes a transistor 612 configured to operate as a switch in accordance with an output signal of the comparator 602. In one non-limiting example, the transistor 612 is defined by a model 2N7002 N-channel enhancement mode MOSFET, as available from Fairchild Semiconductor. Other suitable transistors can also be used.

The comparator 602 compares the voltage divider signal to the LDO signal at the node 502. When the voltage at node 204 decreases below a lesser threshold value (e.g., 10.3 volts DC), the comparator 602 output causes the transistor 612 to pull the REF node 304 to (or toward) ground potential. In turn, the power controller 500 responds to a (near) ground potential at the node 304 by ceasing the provision of twenty-four volts potential to the power output node 104.

When the voltage at the node 204 increases above a greater threshold value (e.g., 11.3 volts DC), the comparator 602 causes the transistor to essentially switch off, allowing the REF node 304 to return to normal voltage (e.g., 1.250 volts DC). The power controller 500 responds to the voltage at the node 304 by returning to normal operations, providing twenty-four volts (nominal) potential to the power output node 104. Thus, the disable circuit 600 causes a disabling of output from the power controller 500 in response to an undervoltage condition at the node 204.

Reference is now made to FIG. 7, which depicts a switch circuit 700 in accordance with the present teachings. The switch circuit 700 includes a transistor 702 configured to couple (i.e., switch) a twelve volt source of electrical energy at the node 102 to an output node 506. In one non-limiting example, the transistor 702 is defined by a model NTD4806, as available from ON Semiconductor, Phoenix, Ariz., USA. The transistor 702 is coupled to be biased into an electrically conductive ("on") state by way of resistor 704 coupled to the power output node 104.

The switch circuit 700 also includes a resettable fuse 706. In one non-limiting example, the resettable fuse 706 is defined by a positive temperature-coefficient device model Polyswitch RXE Series 0.75A, as available from Tyco Electronics Corporation, Menlo Park, Calif., USA. Other suitable models can also be used. The resettable fuse 706 is coupled between the nodes 102 and 506, in parallel circuit relationship with the transistor 702. The resettable fuse 706 carries essentially all electrical current flow from the node 102 to the node 506 when the transistor 702 is biased into an electrically non-conductive ("off") state, as described below. Otherwise, the resettable fuse 706 carries little or no current when the transistor 702 is biased "on".

The switch circuit 700 also includes a transistor 708 coupled to the node 222 by way of resistor 710. In one non-limiting example, the transistor is a model 2N7002 as available from Fairchild Semiconductor, and the resistor 710 is 1 K-Ohm in value. Other suitable models or values can also be used. The transistor 708 is configured to bias the transistor 702 into a non-conductive state when the 24 V-UV signal at node 222 is asserted, and to have essentially no effect on the transistor 702 otherwise.

Generally, the switch circuit 700 is configured to couple source potential from the node 102 to the node 506 by way of the transistor 702 when the power output node 104 is at about normal potential. Conversely, the switch circuit 700 is configured to bias the transistor 702 "off" when the undervolt signal at the node 222 is asserted, such that the resettable fuse 706 performs a protective, current-limiting function.

The switch circuit also includes a transistor 712 coupled between ground node 206 and a thermal (THERM) node 714. The transistor 712 can be defined by a model 2N7002 available from Fairchild Semiconductor. Other suitable transistors can also be used. The transistor 712 is coupled to the 24 V-UV signal at the node 222 by way of a resistor 716. In one non-limiting example, the resistor 716 is 100 K-Ohms in value. Other suitable values can also be used.

The transistor 712 is configured to pull the THERM node 714 to (or toward) ground potential when the 24 V-UV signal is asserted, and to have essentially no effect on the node 714 otherwise. The THERM node 714 provides a signal that is asserted "low" when the 24 V-UV signal is asserted "high", which can be used for any suitable purpose not germane to the present teachings.

Illustrative Printer

Figure 8:
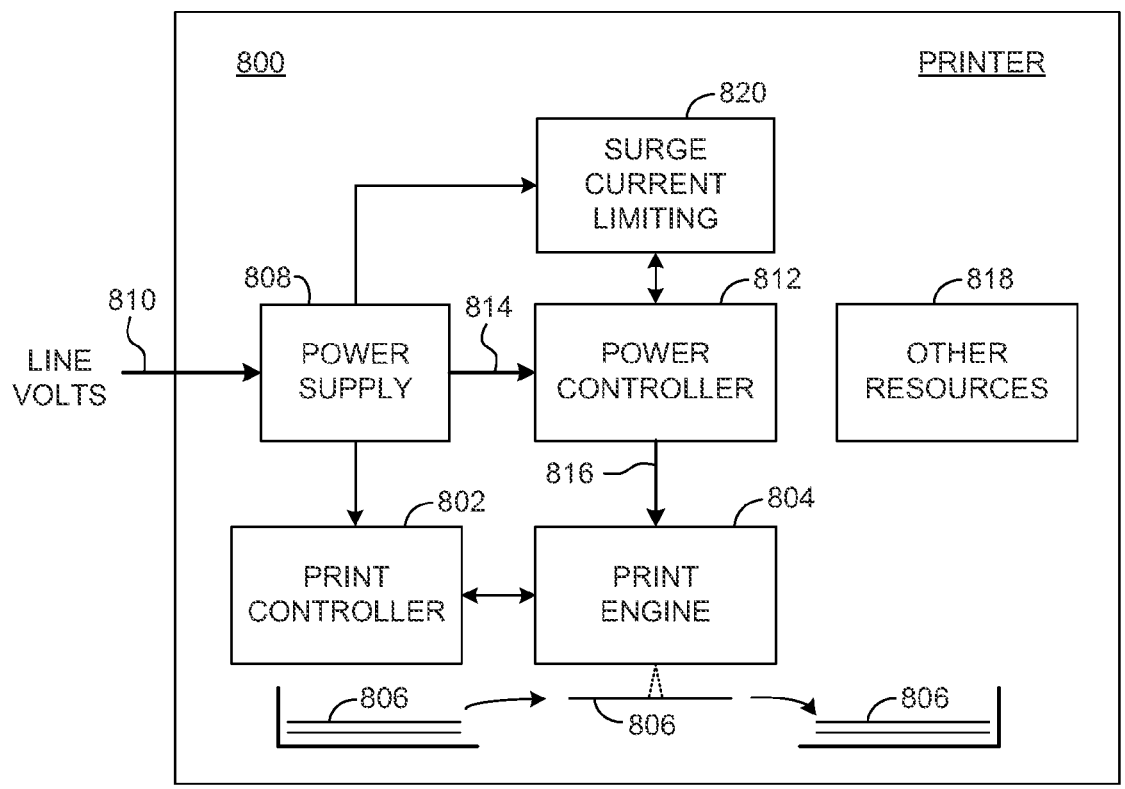
FIG. 8 depicts a block diagrammatic view of a printer according to another example of the present teachings.

Reference is now directed to FIG. 8, which depicts block diagram of a printer 800. The printer 800 is illustrative and non-limiting in nature. Other printers, devices, apparatus and systems are contemplated by the present teachings.

The printer 800 includes a print controller 802. The print controller 802 is configured to control numerous normal operations of the printer 800. The print controller 802 can be defined by or include any constituency including, without limitation, a processor, a microcontroller, an application-specific integrated circuit (ASIC), a state machine, digital or analog or hybrid circuitry, and so on. One having ordinary skill in the printer control or related arts is familiar with printer controllers and further elaboration on the print controller 802 is not germane to the present teachings.

The printer 800 also includes a print engine 804. The print engine 804 is configured to form images on media 806 in accordance with electronic signaling from the print controller 802. In one example, the print engine 804 includes an ink jetting print head. Other print engines are also contemplated. The printer 800 also includes a power supply 808 configured to receive line-level voltage 810 from, for example, a utility source and to provide one or more outputs of regulated DC electrical energy. The power supply can be variously defined, and specific elaboration thereon is not germane to the present teachings.

The printer 800 also includes a power controller 812 configured to receive an electrical energy input 814 of from the power supply 808, and to provide an electrical energy output 816 of at a voltage greater than that at the input 814. In one non-limiting example, the power controller 812 is configured to receive twelve volts DC at the input 814 and to provide twenty-four volts DC at the output 816. Other voltage combinations can also be used. As depicted, the print engine 804 operates by way of the electrical energy provided at output (or node) 816.

The printer 800 also includes other resources 818, which can include, without limitation, a user interface, network communications circuitry, wireless resources, optical scanning capability, an electronic display, and so on. Other constituents or elements can also be included within the other resources 818. One having ordinary skill in the printing or related arts is familiar with resources and features of various printing apparatus, and further elaboration is not needed for an understanding of the present teachings.

The printer 800 also includes surge current (SCL) 820. The SCL 820 can be defined by any electronic circuit (or plurality of cooperative circuits) consistent with the present teachings. In one non-limiting example, the SCL 820 is collectively defined by the respective circuits 100, 200, 300, 400, 600 and 700, inclusive, as described above. Other circuitry can also be used.

The SCL 820 is configured to sense at least the respective voltages at the input 814 and the output 816, and to affect the operation of the power controller 812 in response to under-voltage conditions, surges in load current (e.g., to the print engine 804), and so on. In particular, the SCL 820 is configured to detect a surge in load current and cause the power controller 804 to decrease the voltage at the output 816 by way of foldback signaling. The SCL 820 can perform other functions consistent with the present teachings, as well.

The printer 800 is just one illustrative example of an apparatus including surge current limiting according to the present teachings. Other apparatus that can include surge current limiting such as computers, file servers, network communications devices and so on are also contemplated by the present teachings.

Illustrative Method

Figure 9:
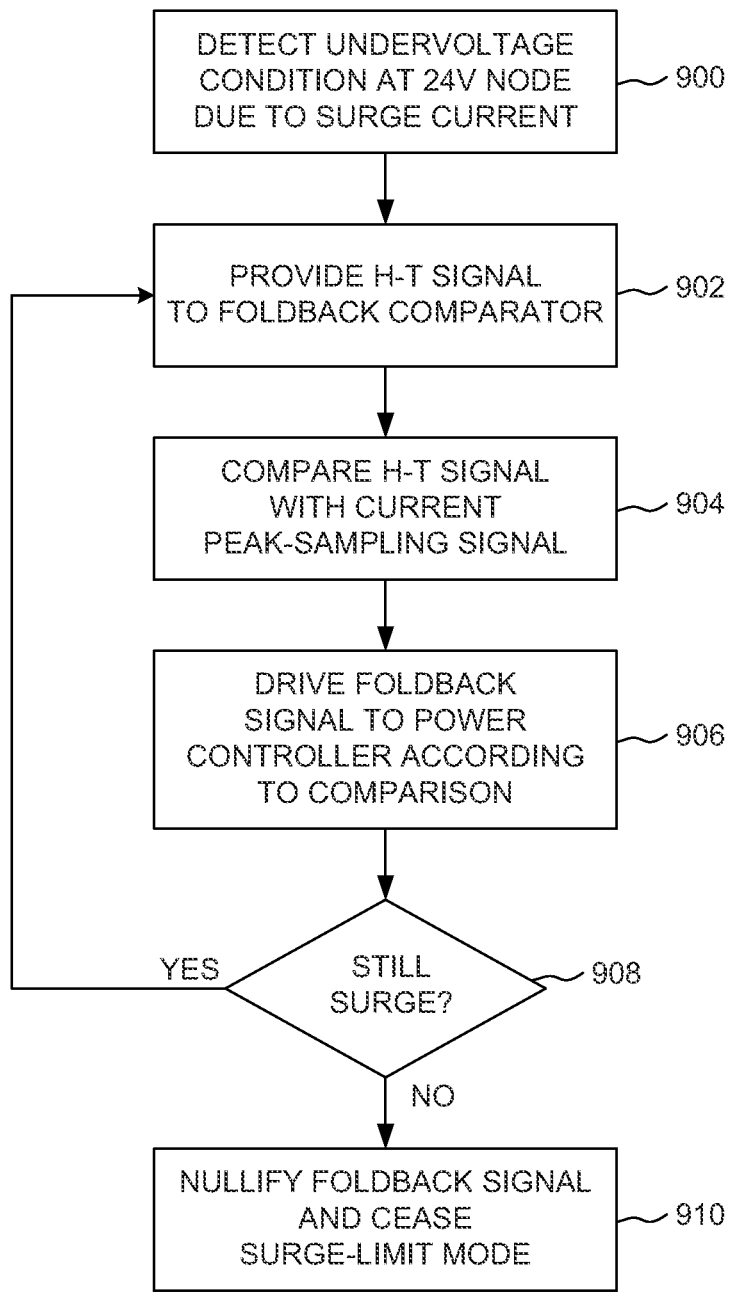
FIG. 9 depicts a flow diagram of a method according to the present teachings.

Reference is now made to FIG. 9, which depicts a flow diagram of a method according to another example of the present teachings. The method of FIG. 9 includes particular steps and proceeds in a particular order of execution. However, it is to be understood that other respective methods including other steps, omitting one or more of the depicted steps, or proceeding in other orders of execution can also be used. Thus, the method of FIG. 9 is illustrative and non-limiting with respect to the present teachings. Reference is also made to FIGS. 1-7 in the interest of understanding the method of FIG. 9.

At 900, an under-voltage condition is detected on a twenty-four volt node. For purposes of a present example, the under-voltage detection circuit 200 detects an under-voltage condition (i.e., below threshold) on the power output node 104 and provides an undervolt signal (i.e., 24 V-UV) at the node 222. The under-voltage condition is understood to be caused by a surge in load current.

At 902, a hold-track signal is provided to a foldback comparator. For purposes of the present example, the undervolt signal at the node 222 is compared to the reference voltage (i.e., REF) at the node 304, resulting in the hold-track (i.e., H-T) signal at the node 324. The node 324 is coupled to a comparator 402 of the foldback circuit 400.

At 904, the hold-track signal is compared with a current peak-sampling signal. For purposes of the present example, a voltage signal corresponding to sampled peak-level load current values are compared to the hold-track signal by the comparator 402. In particular, the peak-level voltage signal is present across the capacitor 424 of the foldback circuit 400.

At 906, a foldback signal is provided to the power controller in accordance with the comparison. In the present example, the comparator 402 provides an output to the constant-current circuit 444 according to the comparison of the peak-level signal and the hold-track signal. The constant-current circuit 444 provides (or derives) the foldback signal 450 accordingly. The foldback signal 450 is coupled to the current sense input node 432, causing the power controller 500 to reduce voltage at the power output node 104.

At 908, it is determined if the surge current condition is still present. If yes, then the method returns to step 902 above and the hold-track signal continues accordingly. If no, then the method proceeds to step 910 below.

At 910, the foldback signal is nullified and the surge current limiting circuitry ceases its active operating mode. For purpose of the present example, the undervolt signal at node 222 is de-asserted, resulting in a de-assertion of the hold-track signal at the node 324 "high". In turn, the foldback comparator 402 provides a reduced output signal. The resulting decrease in the foldback signal 450 has essentially no effect by way of the current sense node 432, and the power controller 500 returns to (or toward) normal, twenty-four volt output at the power output node 104. Surge current being drawn from the power output node 104 is this limited or curtailed. In one example, effective limiting operations occur in five seconds or less. Other performance values can also be used.

The method described above results in limiting or curtailing surge current being drawn from the power output node 104. In one example, effective limiting operations occur in five seconds or less. Other performance values can also be used. The immediately foregoing method is described as a sequence of discrete steps in the interest of clarity. However, it is to be understood that methods or circuits of the present teachings can operate in a very rapid, essentially contemporaneous manner.

Another Illustrative Method

Figure 10:
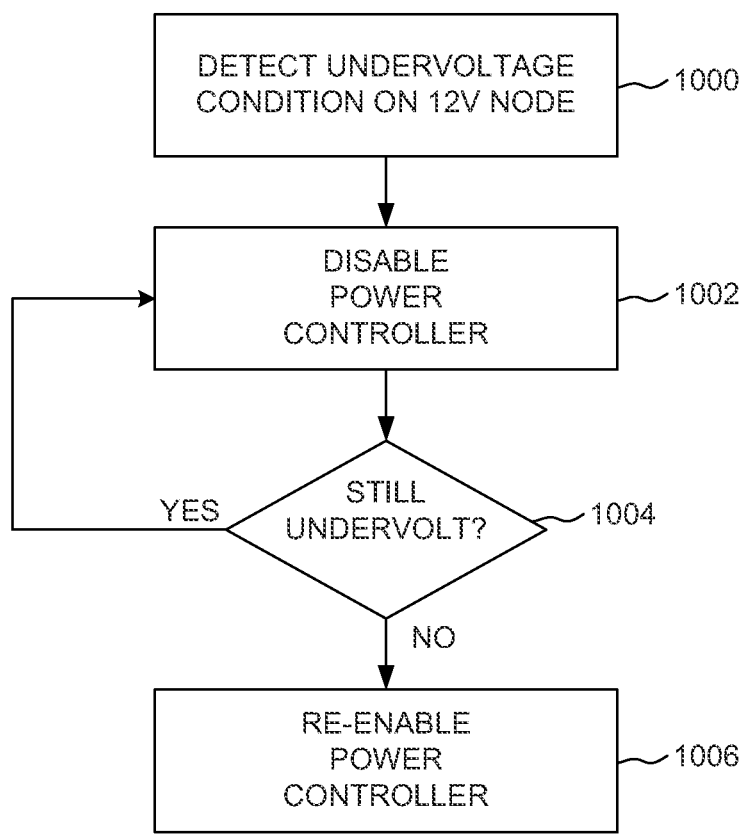
FIG. 10 depicts a flow diagram of another method according to the present teachings.

Attention is turned now to FIG. 10, which depicts a flow diagram of a method according to another example of the present teachings. The method of FIG. 10 includes particular steps and proceeds in a particular order of execution. However, it is to be understood that other respective methods including other steps, omitting one or more of the depicted steps, or proceeding in other orders of execution can also be used. Thus, the method of FIG. 10 is illustrative and non-limiting with respect to the present teachings. Reference is also made to FIGS. 1-7 in the interest of understanding the method of FIG. 10.

At 1000, an under-voltage condition is detected on a twelve volt node. For purposes of a present example, an under-voltage condition at the node 204 is detected by a comparator 602. An output from the comparator 602 drives a transistor 612 into conduction, pulling a reference signal (i.e., REF) at a node 304 "low"—that is, toward ground potential.

At 1002, a power controller is disabled. For purposes of the present example, the "low" signal at the node 304 causes the power controller 500 to cease voltage-boosting operations. Specifically, the power controller 500 halts generation of twenty-four volts at the power output node 104 by ceasing operation of the switching-type voltage-boost circuit 504.

At 1004, it is determined if the under-voltage condition is still present. If yes, then the method returns to step 1002 above and the power controller disable signal continues to be provided. If no, then the method proceeds to step 1006 below.

At 1006, the power controller is re-enabled. For purposes of the present example, the comparator 602 detects that the under-voltage condition on node 204 is no longer present, and ceases to bias the transistor 612 into conduction. In response, the REF signal at node 304 returns to normal (e.g., 1.250 volts). In turn, the power controller 500 assumes normal operations, causing the voltage-boost circuit 504 to provide twenty-four volts DC at the power output node 104.

The immediately foregoing method is described as a sequence of discrete steps in the interest of clarity. However, it is to be understood that methods or circuits of the present teachings can operate in a very rapid, essentially contemporaneous manner.

In general and without limitation, the present teachings contemplate electronic circuitry (a circuit or circuits) that effect the operation of a power controller so as to curtail or limit surges in load current. The respective circuits 200, 300, 400, 600 and 700 are depicted and described individually in the interest of clarity. It is to be understood that any number, or all, of these circuits can be suitably combined to define one or more overall circuits, or that such combination(s) can be defined by integrated circuits.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An electronic circuit configured to:
   detect an under-voltage condition at a power output node and to provide an undervolt signal in accordance with the detecting;
   provide a hold-track signal derived by way of the undervolt signal;
   provide a peak-level signal by way of sampling a voltage correspondent to a load current; and
   provide a foldback signal in accordance with a comparison of the hold-track signal with the peak-level signal, the electronic circuit further configured to couple the foldback signal to a current sensing input of a power controller so as to limit a surge in the load current.

2. The electronic circuit according to claim 1, the electronic circuit further configured to cause the power controller to adjust a voltage at the power output node by way of the foldback signal.

3. The electronic circuit according to claim 1 further configured to:
   sense a low-voltage condition of a source of direct-current voltage; and
   disable operation of the power controller in accordance with the sensing.

4. The electronic circuit according to claim 1, the electronic circuit including a switching element configured to controllably couple circuitry controlled by the power controller to a source of direct-current voltage, the switching element configured to be controlled at least by way of the undervolt signal.

5. The electronic circuit according to claim 4, the electronic circuit including a resettable fuse coupled in parallel circuit relationship with the switching element.

6. The electronic circuit according to claim 4, the electronic circuit further configured to provide a signal to a thermal overload node.

7. The electronic circuit according to claim 1, the electronic circuit including constant-current circuitry configured to provide the foldback signal in response to the comparison of the hold-track signal with the peak-level signal.

8. The electronic circuit according to claim 1 further configured to sample the load current in accordance with a drive signal received from the power controller.

9. The electronic circuit according to claim 1 further configured to provide the hold-track signal by way of time-integrating a comparison of the undervolt signal with a reference voltage received from the power controller.

10. The electronic circuit according to claim 1, the electronic circuit coupled to the power controller, the power controller configured to provide conditioned electrical energy to a printing apparatus.

11. The electronic circuit according to claim 1, the electronic circuit coupled to the power controller, the power controller configured to derive electrical energy of a greater voltage from a source of electrical energy of a lesser voltage by way of switching-type conversion.

12. A method, comprising:
   generating an undervolt signal responsive to sensing an under-voltage condition at an electrical node;
   generating a hold-track signal by way of the undervolt signal;
   generating a peak-level signal by way of sampling a voltage correspondent to a load current; and
   generating a foldback signal in accordance with a comparison of the hold-track signal with the peak-level signal, the foldback signal characterized to cause a power controller to adjust a voltage at the electrical node.

13. The method according to claim 12 further comprising nullifying the foldback signal in response to sensing a normal condition of the load current.

14. The method according to claim 12 further comprising driving a switching element to an electrically non-conductive condition in response to the sensing the under-voltage condition, the switching element configured to electrically couple the power controller to a source of electrical energy.

15. The method according to claim 12 further comprising:
   time-integrating a comparison of the undervolt signal with a reference voltage received from the power controller so as to generate the hold-track signal; and
   sampling the voltage correspondent to the load current in accordance with a drive signal received from the power controller.

* * * * *

UNITED STATES PATENT AND TRADEMARK OFFICE
CERTIFICATE OF CORRECTION

PATENT NO.       : 8,760,833 B2
APPLICATION NO.  : 13/396258
DATED            : June 24, 2014
INVENTOR(S)      : Robert S Wright et al.

Page 1 of 1

It is certified that error appears in the above-identified patent and that said Letters Patent is hereby corrected as shown below:

On the title page, item (73), Assignee, in column 1, line 1, delete "Hewlett Packard" and insert
-- Hewlett-Packard --, therefor.

Signed and Sealed this
Seventh Day of October, 2014

Michelle K. Lee
*Deputy Director of the United States Patent and Trademark Office*